United States Patent Office 3,223,224
Patented Dec. 14, 1965

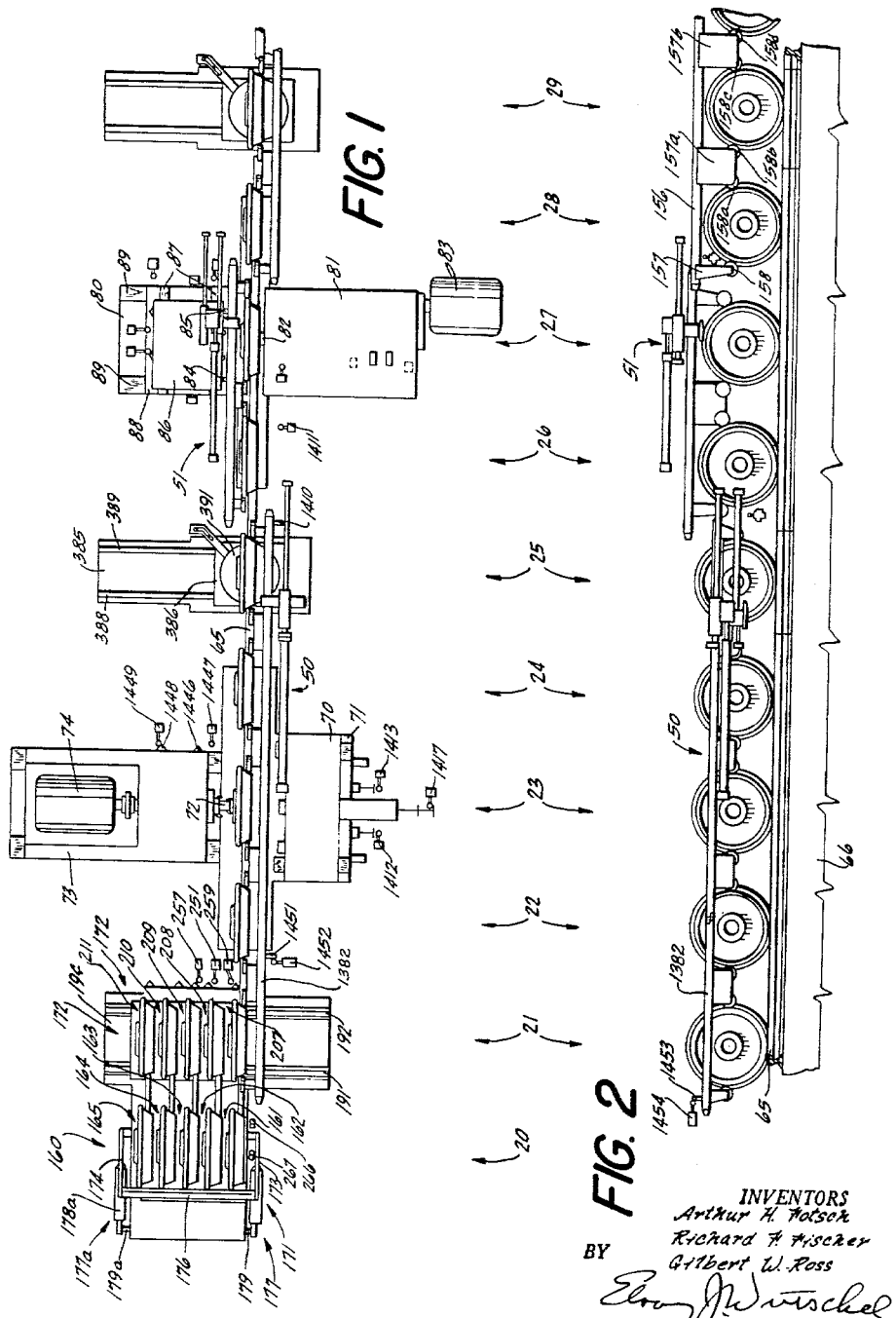

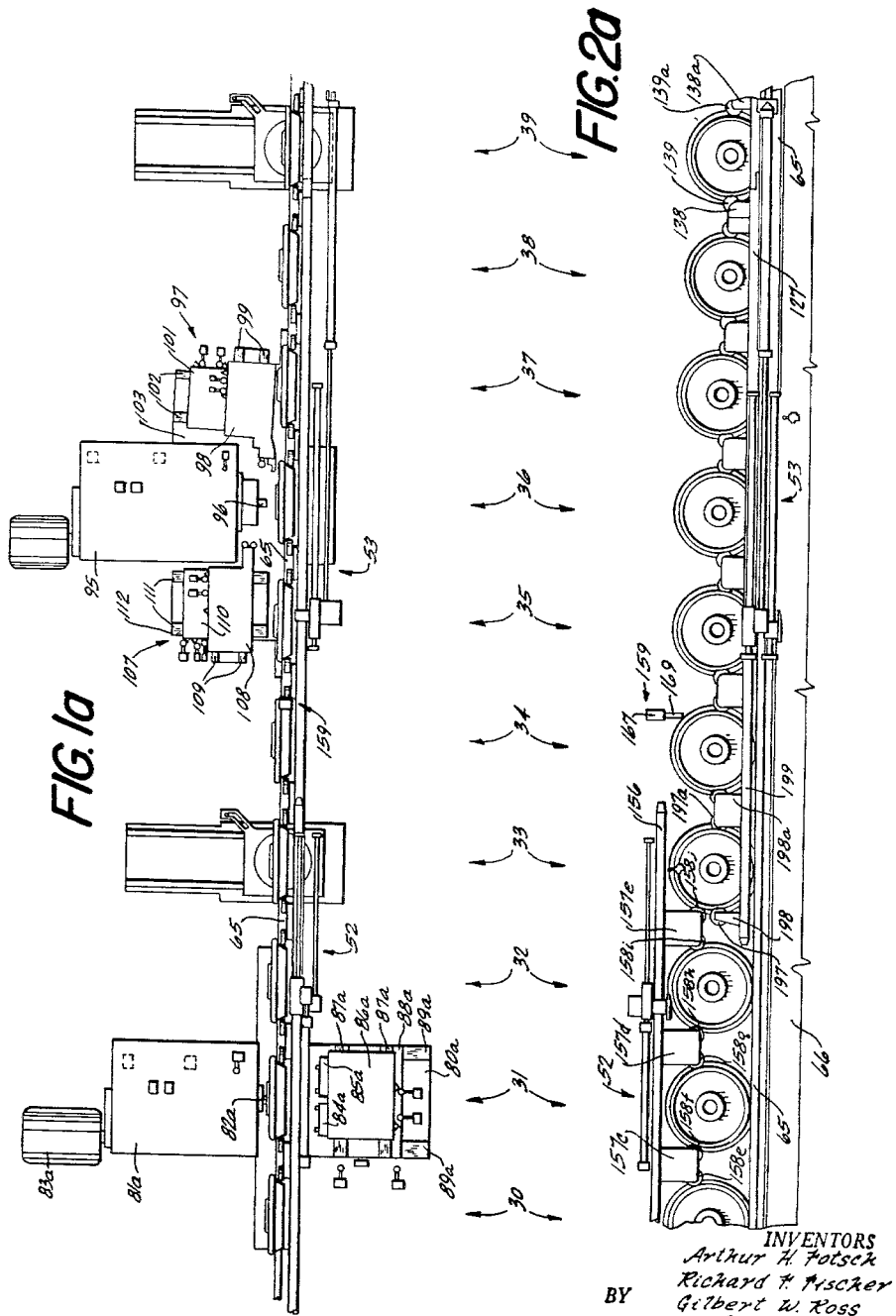

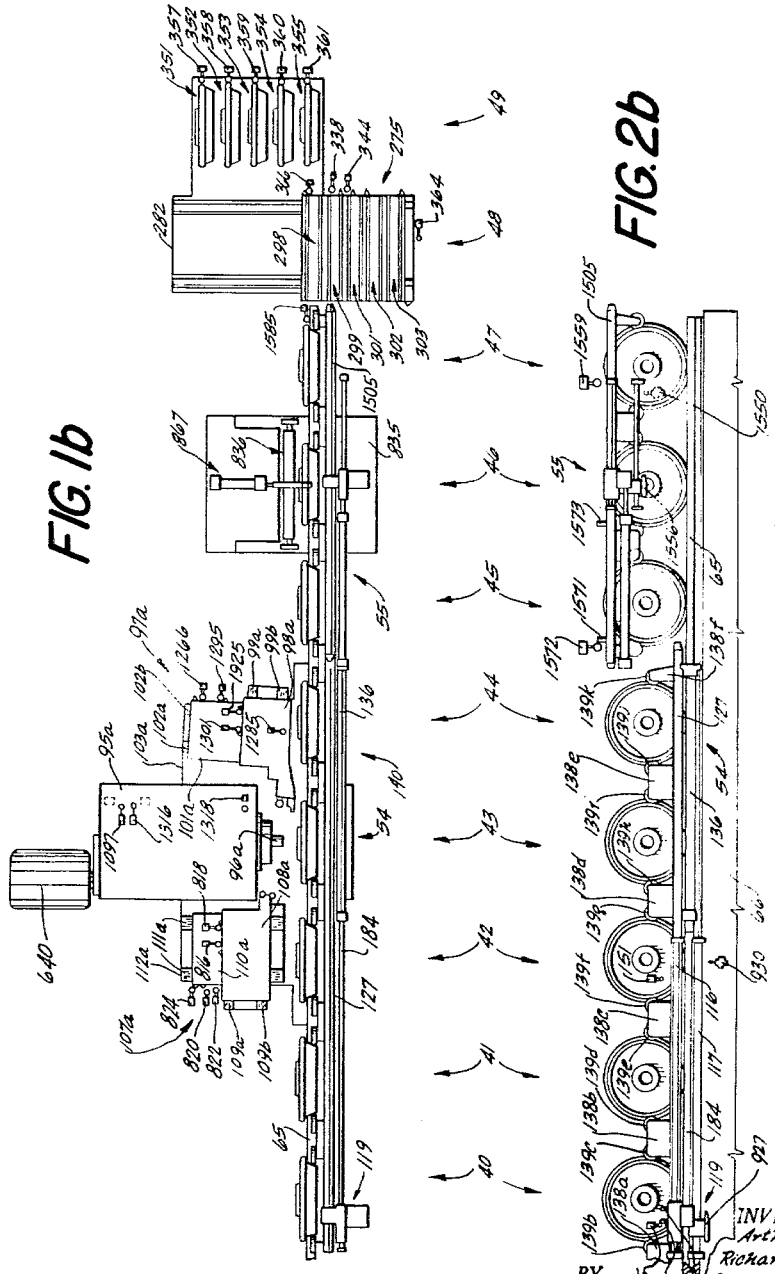

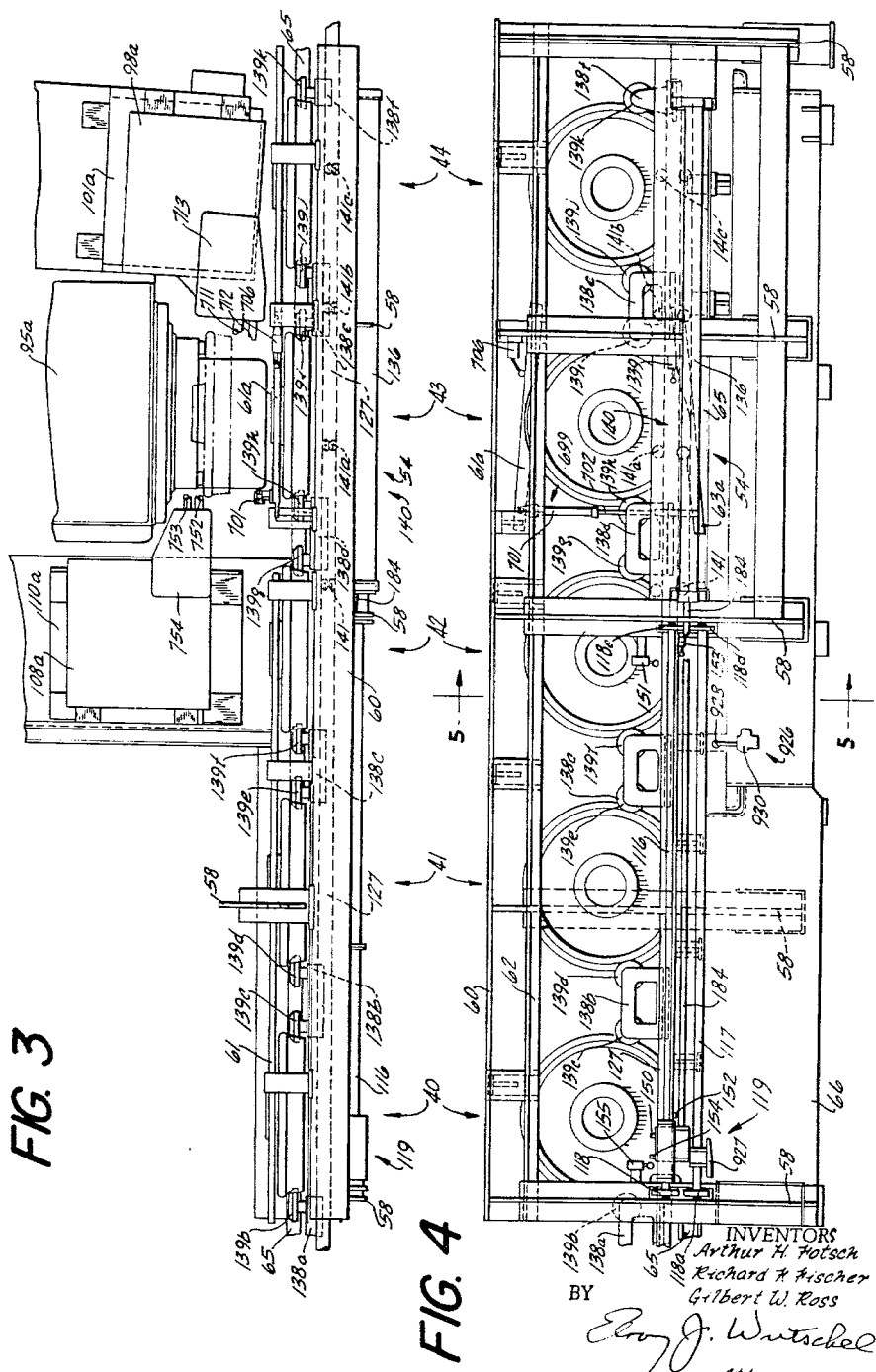

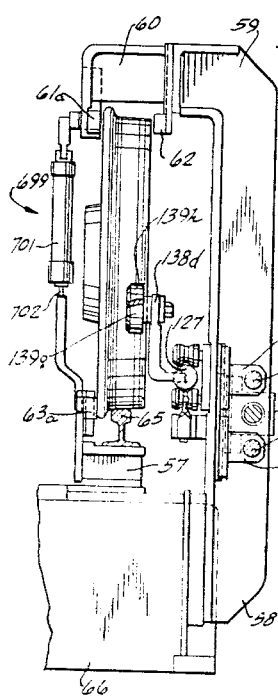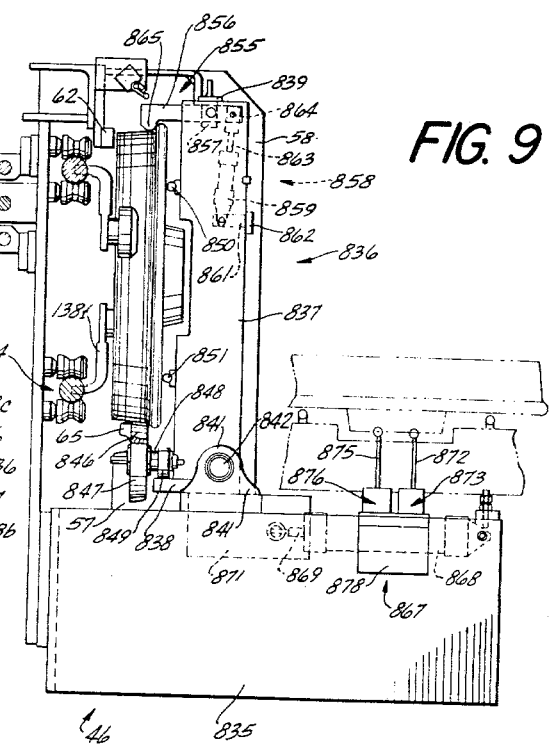

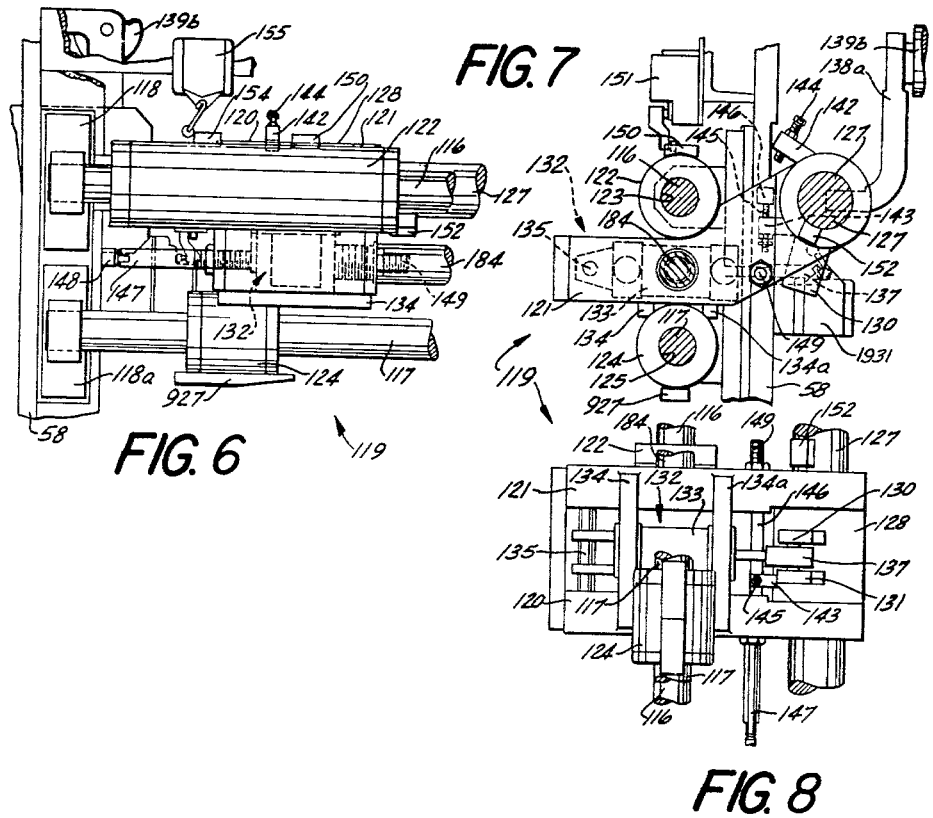

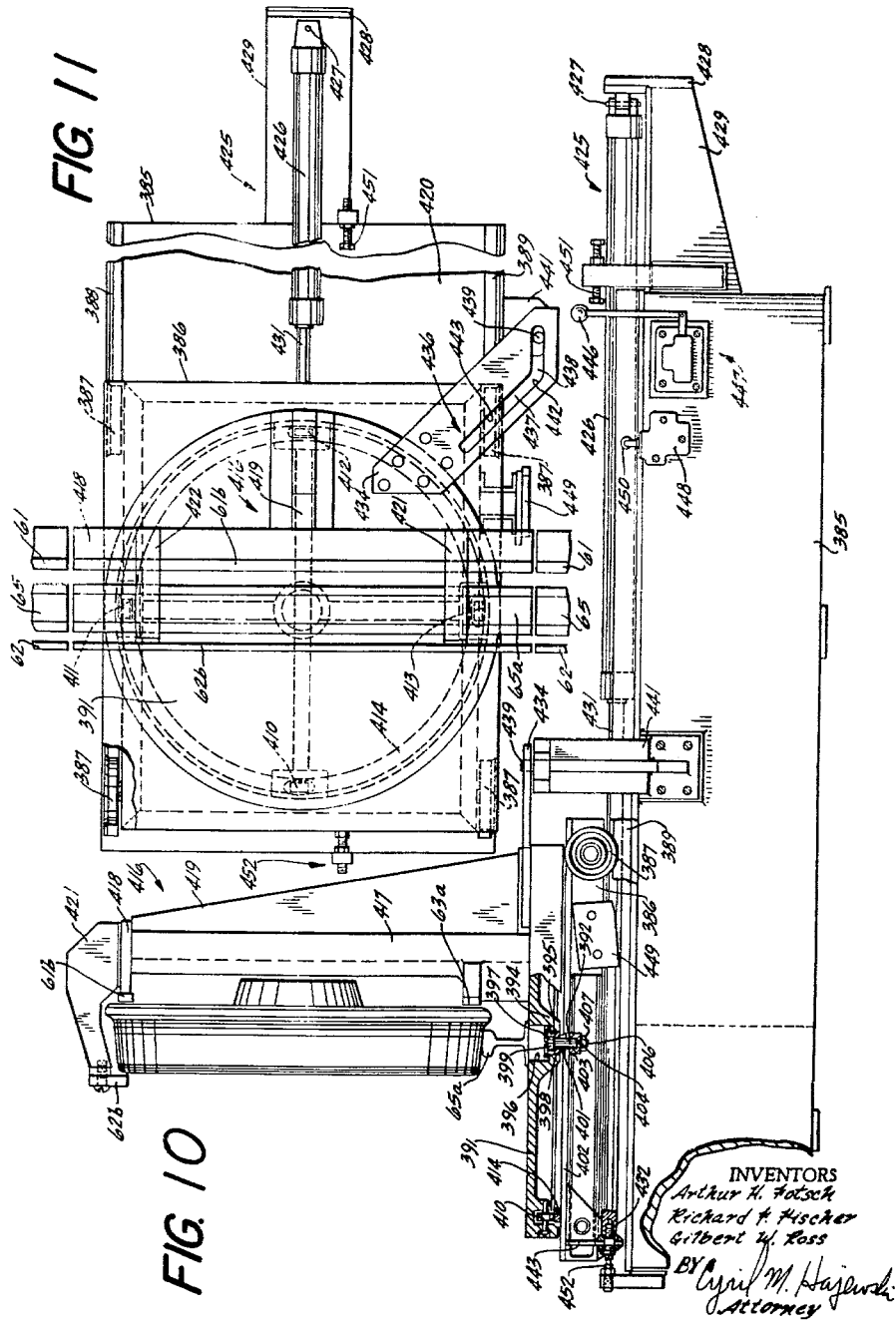

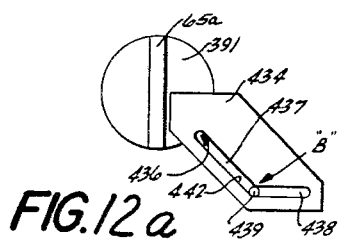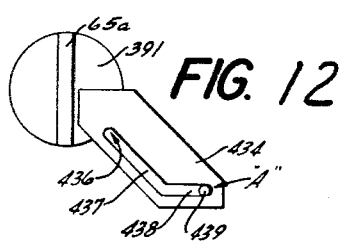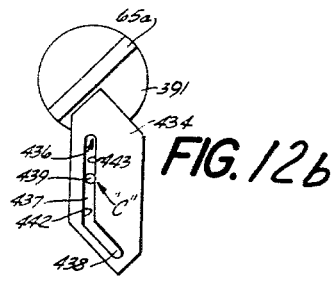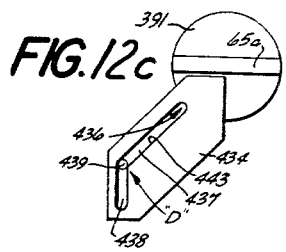

3,223,224
MACHINE TOOL
Arthur H. Fotsch, Wauwatosa, Gilbert W. Ross, Brookfield, and Richard F. Fischer, Santa Rosa, Wis., assignors to Kearney & Trecker Corporation, West Allis, Wis., a corporation of Wisconsin
Application Nov. 29, 1961, Ser. No. 155,630, now Patent No. 3,189,154, dated June 15, 1965, which is a division of application Ser. No. 817,108, June 1, 1959, now Patent No. 3,118,332, dated Jan. 21, 1964. Divided and this application Feb. 15, 1965, Ser. No. 432,468
15 Claims. (Cl. 198—19)

This is a division of United States Patent No. 3,189,154 issued June 15, 1965, which, in turn, is a division of a parent application, now United States Patent No. 3,118,-332, issued January 21, 1964.

This invention relates generally to machines having a transfer line for advancing workpieces in increments into a series of stations successively.

A general object of the present invention is to provide an inspection station in a workpiece transfer line to facilitate the inspection of the workpieces before they are removed from the machine.

Another object is to provide a workpiece transfer line with an inspection station wherein heavy workpieces may be maneuvered into different positions with a minimum effort on the part of the operator to facilitate their inspection.

Another object is to provide a workpiece transfer line with an inspection station wherein heavy workpieces may be readily rotated or shifted by power between a vertical position and a horizontal position for the convenience of the operator inspecting them.

According to this invention the improved workpiece transfer line is provided with an inspection station which is especially adapted to facilitate maneuvering a heavy workpiece for the convenience of the operator who is inspecting the workpiece. The transfer mechanism which advances the workpieces in increments along the transfer line moves each of the completed workpieces into the inspection station where the workpiece is rotatably supported in a frame while it is in a vertical position for the convenience of the operator who is inspecting the workpiece. To further facilitate such inspection, the workpiece may be clamped to the frame and the latter pivoted downwardly to locate the workpiece in a horizontal position for rendering portions of it more accessible to the inspector.

The foregoing and other objects of this invention will become more fully apparent from the following detailed description, and may be achieved by the exemplifying apparatus depicted in and further described in detail in connection with the accompanying drawings, in which:

FIGURES 1, 1a and 1b are fragmentary plan views of a machine tool incorporating the features of the present invention and taken collectively, in the order stated, show a complete plan view, of the machine tool organization for carrying out a number of work operations on a series of railroad car wheels, the progress of the car wheels being from left to right;

FIGS. 2, 2a and 2b, taken collectively, in the order stated, show a front elevational view of the transfer mechanisms employed, and correspond to the showing made in FIGS. 1, 1a and 1b respectively, the various machine units and other structure being omitted to more clearly show the arrangement of the transfer mechanisms;

FIG. 3 is a fragmentary plan view of the machine tool organization showing the relationship of the last profiling and turning machine unit therein with respect to the transfer line and including the three idle stations preceding the unit and one idle station following the unit;

FIG. 4 is a fragmentary front elevational view of the machine tool organization corresponding to the showing made in FIG. 3 and illustrating the transfer mechanism employed with the profiling and turning unit depicted in FIG. 3;

FIG. 5 is a view in transverse vertical section taken along the plane represented by the line 5—5 in FIG. 4;

FIG. 6 is an enlarged detail view in front elevation depicting the carrier mechanism associated with the transfer mechanism employed at the last profiling and turning station;

FIG. 7 is an enlarged detail view in right side elevation illustrating the carrier shown in FIG. 6;

FIG. 8 is an enlarged bottom view of the carrier shown in FIG. 7;

FIG. 9 is a right side elevational view illustrating the inspection station as seen from the discharge side of the station.

FIG. 10 is a side elevational view of a move out station as observed from a position transverse of the transfer line on the discharge side of the unit, with parts being broken away to more clearly show the various mechanisms associated therewith;

FIG. 11 is a plan view of the move out station shown in FIG. 10; and,

FIGS. 12, 12a, 12b and 12c are schematic views illustrating the various positions of the rotary table of the move out station, shown in FIGS. 10 and 11, as effected by the cam and the cam follower.

While the invention herein described is a preferred embodiment, it is not intended to limit the invention to the specific form and arrangement shown, it being contemplated that various changes may be made without departing from the spirit and scope of the appended claims.

Reference is now made to the drawings and particularly to FIGS. 1, 1a, 1b, 2, 2a and 2b thereof, which illustrate a production type machine tool capable of performing a series of work operations on a circular workpiece such as a railroad car wheel W while they are disposed in separate machining units or work stations of the machine tool. It is to be understood that FIGS. 1, 1a and 1b are plan views of three contiguous sections of the machine and taken together in order, constitute a plan view of the entire machine. In like manner, FIGS. 2, 2a and 2b are front elevational views of three contiguous sections of the transfer mechanism organization and taken together in the order stated constitute a front elevational view showing the transfer mechanisms of the machine. The work machining stations are indicated generally in FIGS. 1, 1a, 1b, 2, 2a and 2b by the reference numerals 23, 27, 31, 36 and 43 and are spaced along a guideway on which the workpieces are advanced step-by-step by transfer mechanisms 50, 51, 52, 53, 54 and 55. The arrangement is such that each work station is associated with an independently operating transfer mechanism. Each work station is separated from the adjacent work station by one or more idle stations 22, 24, 26, 28, 30, 32, 34, 35, 37, 38, 40, 41, 42, 44, 45 and 47 and move out stations 25, 29, 33 and 39. Inserted into the line between the idle stations 45 and 47 is an inspection station 46. Preceding and following the line of work and idle stations is a loading station 21 and a receiving station 48 respectively from which workpieces are supplied to the machining units and in which the finished workpieces are unloaded. Preceding the loading station 21 and following the receiving station 48 are storage stations 20 and 49 respectively. A plurality of workpieces may be stored in the storage station 20 prior to being moved into the loading station while the finished workpieces may be moved from the receiving station 48 into the storage station 49 for storage and subsequent disposition.

The move out stations 25, 29, 33 and 39 serve as access stations for removing from or inserting workpieces into the line to thereby render the machine tool extremely flexible in operation. By employing the move out stations one or more of the machines or work stations may be inoperative, for servicing or other reasons, without stopping the operation of the entire machine tool. For example, if the work station 27 is down for any reason this station may be by-passed by removing workpieces from the line through operation of the move out station 25 and the workpieces may be reinserted back into the line through the move out station 29.

The inspection station 46 provides for inspection of the workpiece after a complete work operation has been performed on it so that an imperfect workpiece may be removed from the line prior to its being transferred to the receiving and storage stations 48 and 49. Thus, only completely acceptable finished workpieces will be transferred to the receiving and storage stations.

The workpieces or car wheels in the various stations are rotatably advanced into the succeeding stations along a horizontal guide rail 65 on a bed structure defining a rectilinear path of advance of the car wheels through the series of stations. The guide rail 65 is secured and positioned on a base structure 57, as shown in FIG. 5, and is welded or otherwise secured to the top surface of a bed structure 66. Spaced along the bed structure 66 and upstanding therefrom are a plurality of columns 58 having laterally extending overarms 59 which serve to carry a horizontally disposed reinforcing plate member 60 to which an upper car wheel guideway is secured. The upper guideway comprises a pair of horizontally extending spaced apart fence rails 61 and 62 which serve to confine the top portion of the car wheel therebetween to maintain the car wheels in an upright position as they are rolled along on the lower guide rail 65. A lower or bottom fence rail 63 carried by the base 57 is disposed to engage the flanged side of the car wheel to prevent it from slipping off of the lower guide rail 65. The columns 58 are disposed on either side of the bed structure 66 as may be desired so as not to interfere with operation of the various work stations.

The machines or work stations shown in the exemplary embodiment involve the performance of four different metal removing operations. At station 23 a boring operation is performed to rough bore the axial opening in the hub of the car wheel. At station 27 a facing operation is performed to face the back surface of the flange of the car wheel. At station 31 another facing operation is performed to machine the front face surface of the hub and also the outer surface of the car wheel rim. Stations 36 and 43 are identical and at these stations a turning operation is performed on the flange to generate a desired contour thereto and also to turn the periphery of the running surface of a car wheel. Thus, the work operations performed on the car wheels at stations 23, 27 and 31 are relatively fast operations, while the work operation performed at stations 36 and 43 is a relatively slower operation taking approximately twice as long as the operations performed at stations 23, 27 and 31. Therefore, the exemplary machine tool shown, includes the two stations 36 and 43 for turning the flange and periphery of two different car wheels simultaneously so that the entire machine tool may operate at a speed time to the faster operations.

The boring machine at station 23 comprises a chuck head 70 which is supported on a base 71 and is operable to receive and hold a car wheel located at the station in axial alignment with a boring tool 72 carried by a tool head 73. The tool head 73 is supported for reciprocal movement in a direction transverse to the transfer line to feed the boring tool to the car wheel. The boring tool 72 is rotatably driven by a motor 74 supported on the base 71. The boring tool and chuck head structure of station 23 are described in United States Patent No. 3,188,890 issued June 15, 1965, and therefore will not be described here in detail.

The facing machine at station 27 generally comprises a base 80 which extends transversely of the production line on either side thereof and has a fixture head 81 supported thereon. The fixture head 81 is provided with a rotatable and axially movable chucking spindle 82 which is movable into the axial opening of a hub of a car wheel at the station and operable to securely clamp the car wheel thereto. In order to clamp the car wheel in machining position the chucking spindle 82 with the car wheel secured thereto is retracted to force the car wheel against a rotatable drum supported within the fixture head, and the drum and the car wheel secured to it are rotated. A pair of tool holders 84 and 85 are mounted on a slide 86 that is supported for movement parallel to the transfer line on a pair of ways 87 provided on a cross slide 88. The cross slide 88 is supported for transverse movement toward and away from the transfer line on a pair of ways 89 provided on the base 80. Thus, the tools carried by the tool holders 84 and 85 may be advanced into work engagement with the rotating car wheel by advancing the cross slide 88 and then be moved parallel to the car wheel to perform the desired facing operation on the car wheel through the feeding movement of the slide 86.

The facing machine at station 31 is identical to the facing machine at station 27 with the exception that it is reversed so that a facing operation may be performed on the opposite side of a car wheel at the station. Thus, the fixture head 81a is disposed on the base 80a at the rear of the transfer line. The fixture head 81a is provided with a rotatable and axially movable chucking spindle 82a which is rotatably driven by a motor 83a. Likewise, a pair of tool holders 84a and 85a are mounted in car wheel facing position on a slide 86a which is supported for movement parallel to the transfer line on a pair of ways 87a provided on a cross slide 88a. The cross slide 88a is supported for movement transversely of the transfer line toward and away from the chuck head 81a, on a pair of ways 89a provided on the base 80a.

The machine units at stations 36 and 43 are identical, and generally comprise fixture heads 95 and 95a in which rotatable and axially movable chucking spindles 560 and 561, respectively, are supported. The fixture head structures 95 and 95a are identical to the fixture heads 81 and 81a at stations 27 and 31. The fixture heads 95 and 95a have axial movable chucking spindles 560 and 561 which are operable to engage the walls of the axial openings of the car wheels and are operable to retract the car wheels from the guide rail 65 to clamp them in machining position.

The machine units at stations 36 and 43 include tool units 97 and 97a which are located on the right hand side of the fixture heads 95 and 95a, respectively, as viewed in FIGS. 1a and 1b. The tool units 97 and 97a comprise tool carrying cross slides 98 and 98a which are supported for movement towards or away from their respective fixture heads, on ways 99 and 99a provided on compound slides 101 and 101a, respectively. The compound slides 101 and 101a are supported for movement toward or away from the production line on ways 102 and 102a provided on bases 103 and 103a, respectively. The tools carried on the cross slides 98 and 98a are employed to turn the periphery of the tread of the car wheel and to form the radius of the edge of the car wheel which is adjacent the tread and front face of the wheel.

The machines at stations 36 and 43 also include tool units 107 and 107a which are disposed to the left side of their respective fixture heads 95 and 95a, as viewed in FIGS. 1a and 1b. The tool units 107 and 107a comprise tool carrying cross slides 108 and 108a which are supported for movement parallel to the transfer line towards or away from their respective fixture heads 95 and 95a, on ways 109 and 109a provided on compound slides 110 and 110a, respectively. The compound slides 110 and 110a are supported for movement toward or away from the transfer line on ways 111 and 111a provided on bases 112 and 112a. The tools carried by the cross slides 108 and 108a are disposed so as to engage with the flange of the car wheels located in the respective stations to perform a profiling operation on the flange of the car wheel.

The stations 21 through 48 are equally spaced along the path of travel of the workpieces. Preferably, the two turning stations are disposed as the last two work stations, as shown in FIGS. 1a and 1b, so that all of the relatively faster work operations may be performed first with the relatively slower turning operations being formed as the last work operations.

The car wheels are advanced through the various stations by means of the transfer mechanisms 50, 51, 52, 53, 54 and 55, as previously mentioned, each of which is independently operable between certain prescribed stations. Thus, the transfer mechanism 50 associated with the work station 23 is operable to transfer car wheels from stations 21 through 26; the transfer mechanism 51, associated with the work station 27 operates to transfer car wheels from station 26 through station 28; the transfer mechanism 52, associated with the work station 31 operates between station 28 through station 34; the transfer mechanisms 53 and 54, associated with the work stations 36 and 43, respectively, have their transfer bars connected together and operate as a unit from station 33 through station 46; and the transfer mechanism 55, associated with the inspection station 46 operates from station 45 through station 48.

With the exemplary machine tool shown it is contemplated transferring car wheels through the series of stations in a manner that each car wheel dwells in and is machined at each of the stations 23, 27 and 31 at which the relatively faster machining operations are performed, while car wheels are moved into and machined in the slow operating stations 36 and 43 where the car wheels remain while two cycles are being completed at the faster stations. To accomplish this, the car wheels in stations 33 through 44 are advanced in double length steps so that a car wheel in station 34 will be moved into work station 36 while a car wheel in station 33 is moved past station 34 and into station 35. The car wheel in station 41 will be moved into the slow work station 43 while the car wheel in station 42 will be advanced through the slow station 43 into station 44. Thus, a car wheel that is in the even numbered station 34 will have the slower turning operation performed on it at the even numbered station 36 while the car wheel in the odd numbered station 33 will have the slower turning operations performed on it at the odd numbered station 43.

In order to accomplish this double step transfer, the transfer mechanism 54, acting as a unit with the transfer mechanism 53, must also operate to transfer car wheels from stations 43 and 44 into stations 45 and 46, respectively, to clear those stations for the car wheels from stations 41 and 42. Since the transfer mechanisms 53 and 54 need only operate every other cycle, the transfer mechanism 55 operating between stations 45 through 48 will necessarily operate every cycle. In operating every cycle the transfer mechanism 55 will serve to advance car wheels in stations 45, 46 and 47 one station in every cycle. Thus, in a first cycle of operation the car wheels in stations 45, 46 and 47 will be advanced to stations 46, 47 and 48, respectively. In the second cycle of operation and operating in conjunction with the cycle of operation of the transfer mechanisms 53 and 54, the car wheels in stations 46 and 47 will be advanced into stations 47 and 48, respectively, making the stations 45 and 46 available to car wheels from stations 43 and 44 advance in a double step by the transfer mechanisms 53 and 54.

The correlated differential advancing movements of the car wheels through the machine may be effected through the use of the independent transfer mechanisms 50 through 55 of the reciprocable type. These transfer mechanisms are arranged to be actuated in proper timed sequence and to act selectively on the proper car wheels in the different stations. Herein, the transfer mechanism 54 associated with the turning station 43 for accomplishing the double station transfer between stations 40 through 46 is set forth in detail and comprises a pair of horizontally disposed guide bars 116 and 117 which are secured in spaced relationship to the columns 58 in mounting brackets 118, 118a, 118b and 118c, the guide bars 116 and 117 being of a length to extend between stations 40 and 42, as shown in FIGS. 3 and 4.

A transfer bar carrier, generally indicated by the reference numeral 119, is slidably mounted on the guide bars 116 and 117 for movement between a retracted position, as shown in FIGS. 3 and 4, to an advanced position at the opposite end of the bars 116 and 117, at station 42. The transfer bar carrier 119 as shown in FIGS. 6, 7 and 8 comprises a pair of spaced arm members 120 and 121 that are disposed so as to extend transversely of the guide bars 116 and 117. A tubular elongated bearing member 122 having an axial bore 123 is secured to the top surfaces of the arm members 120 and 121 as by welding. A second tubular bearing member 124 having an axial bore 125 is secured to the bottom surface of the two arm members as by welding. The two bearing members 122 and 124 are adapted to be slidably mounted on the guide bars 116 and 117 in a manner so that the carrier 119 is slidably supported on the bars for movement between the stations 40 and 42, as previously mentioned. The inner extending ends of the arm members 120 and 121 are provided with aligned openings through which a relatively long transfer bar member 127 extends.

Mounted about the transfer bar 127 and disposed between the two arm members is an actuating sleeve member 128 which is pin connected to the transfer bar 127 so as to be operable to move the transfer bar axially and also to effect its rotation. The actuating member 128 which is disposed between the two arm members 120 and 121 is provided with a pair of downwardly or radially extending spaced apart lugs 130 and 131 to which is pivotally secured the free end of a piston rod 137 of a fluid actuator, generally indicated by the reference numeral 132. The fluid actuator 132 comprises a cylinder 133 which is disposed between the two arm members 120 and 121. The cylinder 133 has one end pivotably secured to a rod 135 which is mounted in the outwardly extending ends of the arms 120 and 121 that are rigidly reinforced by straps 134 and 134a. The cylinder 133 reciprocably supports a piston which is provided with the piston rod 137, the free end of which is pivotably connected to the lugs 130 and 131 of the actuating sleeve member 128, as previously mentioned, and, as clearly shown in FIGS. 7 and 8. To effect movement of the transfer bar carrier 119 between stations 40 and 42 to produce an axial movement of the transfer bar 127 from a retracted position to an advanced position and return there is provided a fluid actuator 140 comprising a relatively long cylinder 136 that is mounted on the sides of the columns 58. A piston (not shown) is reciprocably supported within the cylinder and is provided with an elongated piston rod 184 the free end of which is threadedly connected into the side of the arm 121. The transfer bar 127 may therefore be moved axially by actuation of the piston in the cylinder 136 and it may be pivoted about its axis by the operation of the actuator 132.

To effect movement of car wheels at stations 40, 41, 42, 43 and 44 in a controlled rolling movement of advancement on the guide rail 65, the transfer bar 127 is provided with a plurality of arm members 138, 138a, 138b, 138c, 138d, 138e and 138f. The arm members 138 to 138f, inclusive, serve to actuate and control the advancement of the car wheels and are provided with rollers 139, 139a, 139b, 139c, 139d, 139e, 139f, 139g, 139h, 139i, 139j and 139k. Since the arms 138 and 138f are the end arms of the transfer bar they are provided with the single rollers 139 and 139k, respectively, as shown in FIGS. 2a, 2b, 3 and 4. The intermediate arms 138a, 138b, 138c, 138d and 138e, each are provided with a pair of rollers, the arm 138a having the rollers 139a and 139b, the arm 138b having the rollers 139c and 139d, the arm 138c having the rollers 139e and 139f, the arm 138d being provided with the rollers 139g and 139h, and the arm 138e having the rollers 139i and 139j. The rollers of the respective arms are so arranged that when the actuator 132 is operated to rotate the transfer bar 127 and pivot the arms 138 to 138e inclusive, into an operating or transfer position the rollers 139 and 139a serve to engage the periphery of a car wheel in the station 39, as shown in FIG. 2a, while the other rollers similarly engage the peripheries of the other car wheels in the line in the manner illustrated in FIG. 2b. Thus, upon axial movement of the transfer bar 127 in a direction to advance the car wheels, the rollers 139, 139b, 139d, 139h, and 139j, will operate to produce a rolling movement of the car wheels associated therewith while, the rollers 139a, 139c, 139e, 139g, 139i and 139k will serve to control the rolling advancement of the wheels. When the transfer bar 127 is moving in a direction of transfer it will move between a plurality of sets of guide rollers 141, 141a, 141b and 141c which serve to support and guide the unsupported extending end of the transfer bar as it moves axially in an advancing direction.

As shown in FIG. 7, the transfer bar actuating sleeve member 128 is provided with a pair of lugs 142 and 143 which threadedly receive threaded studs 144 and 145, respectively, and which serve as adjustable stops for controlling the amount of angular movement which will be imparted to the transfer bar actuating member 128 and thereby serve to control the pivotal positioning of the transfer arms. The threaded studs 144 and 145 are disposed to engage a stop bar 146 to limit the amount of rotation that may be imparted to the actuating member 128. Thus, when the transfer bar actuating member 128 is rotated to a position wherein the arms of the transfer bar 127 are in operating position the stud 145 of the lug 143 engages the stop bar 146 to effect a positive positioning of the arms in their operating position.

In operation with the transfer arms 138, 138a, 138b, 138c, 138d, 138e and 138f in their operating pivotal position to advance the car wheels in a controlled rolling movement of advancement, the fluid actuator 140 will be energized to operate in a rightward direction, as viewed in FIGS. 1b, 2b 3 and 4, to effect advancement of the transfer bar carrier 119 rightwardly along the guide bars 116 and 117 and thereby effect the axial movement of the transfer bar 127 for moving its associated transfer arms for advancing the car wheels along the guide rail 65. Since, as previously mentioned, the machining unit at station 36 is identical to the machining unit at station 43 and performs the same profiling and turning operation, only every other car wheel will be moved into station 43 to have a profiling and turning operation performed on it therein, and the fluid actuator 140 will operate to move the car wheels a distance corresponding to the space between two stations in a double step transfer. For example, as viewed in FIGS. 1b, 2b, 3 and 4, the car wheel in station 42 will have had a profiling and turning operation performed on it at the preceding machining station 36, and therefore, it will be necessary to pass this car wheel through station 43 into station 44 while the car wheel in station 41 must be moved into station 43 to have a profiling and turning operation performed on it. Since the transfer mechanism 54 associated with the work station 43 is an independently operable unit, the transfer bar 127, when retracted, will extend rearwardly through station 39 sufficiently far so that the end transfer arm 138 will be engageable with the periphery of a car wheel in station 39 at the left side of the car wheel, as shown in FIG. 2a. Thus, when the transfer mechanism operates rightwardly in a transfer movement, the car wheels that are in stations 39, 40, 41, 42, 43 and 44 will be advanced into stations 41 to 46, respectively. It is apparent that the car wheels in the odd numbered stations will have a profiling and turning operation performed on them at the odd numbered turning station 43, while the car wheels in the even numbered stations will have the same profiling and turning operation performed on them at the even numbered station 36. When the transfer is completed, a dog 150 secured to the top of the bearing member 122, as shown in FIGS. 6 and 7, will actuate a limit switch 151, shown in FIG. 4, to de-energize the fluid actuator 140 for stopping its operation. The limit switch 151, when actuated, is also operable to effect energization of the fluid actuator 132 carried by the carrier 119 to effect its operation in a direction to rotate the transfer bar 127 in a direction to retract the arms 138 to 138f, inclusive, so as to move the rollers of the arms out of car wheel engagement. When the transfer bar 127 as been rotated sufficiently in a direction to fully retract the arms out of car wheel engagement, a dog 152 on the bottom of the transfer bar, as shown in FIGS. 6, 7 and 8, actuates a limit switch 153, shown in FIG. 4, to effect energization of the fluid actuator 140 for its operation in a direction to move the carrier 119 leftwardly for moving or retracting the transfer bar 127 to its original position. When retraction has been fully completed a dog 154 provided on the member 122, as shown in FIGS. 4 and 6, actuates a limit switch 155 to effect de-energization of the fluid actuator 140 stopping its operation. The limit switch 151, when actuated, will also operate to initiate the fixturing cycle, to be subsequently described, so that fixturing of the car wheel to the fixture head 95a takes place at the same time that the transfer bar 127 is being retracted.

Since the transfer mechanisms 53 and 54 both operate in double step transfers and operate only every other cycle, their associated transfer bars are mechanically connected together and the fluid actuators thereof are operated simultaneously so that the transfer mechanisms 53 and 54 operate as a single unit. That is, the transfer mechanisms 53 and 54 operating as a unit and in every other cycle function to transfer car wheels in stations 33 through 44 into stations 35 through 46, respectively.

Since the transfer mechanism 52 operates from station 28 through station 33, a transfer bar 156 thereof is provided with an arm 157 having a roller 158, an arm 157a having rollers 158a and 158b, an arm 157b having rollers 158c and 158d, an arm 157c having rollers 158e and 158f, an arm 157d having rollers 158g and 158h, and an arm 157e having rollers 158i and 158j. Thus, the periphery of the car wheels in the stations 28 to 32 will be engaged on opposite sides of the wheel by a pair of rollers which serve to advance the car wheels along the guide rail 65 in a controlled rolling movement of advancement. It will be noted that a car wheel in the station 33 is engaged only by the roller 158j and as the transfer mechanism 52 is operated in an advancing movement the car wheel in the station 33 will be advanced by the roller 158j but no control roller has been provided. To prevent the car wheel being advanced from station 33 into station 34 from rolling past the latter station, a solenoid actuated stop mechanism 159 is provided. The stop mechanism 159 comprises a solenoid 167 having a plunger 169, as diagrammatically shown in FIG. 2a. The solenoid 167 is normally de-energized to permit the plunger 169 thereof to extend into the path of travel of the car wheels so that a car wheel advanced along the production line from station 33 into station 34 by the roller 158j of the arm 157e will be stopped at the station 34 by the extended plunger 169 of the stop mechanism 159. The necessity of omitting a companion control roller for the advancing roller 158j is apparent if it is recalled that during each alternate cycle of operation the transfer mechanisms 52 and 53 operate simultaneously. Therefore, if a companion control roller was supplied for the advancing roller 158j a car wheel advanced from station 33 into station 34 would be engaged by the advance roller 158j and the omitted control roller. It would also be engaged by the rollers 197 and 197a of the arms 198 and 198a of the transfer bar 199 of the transfer mechanism 53. Therefore, during the cycle of operation wherein the transfer mechanisms 52 and 53 operate simultaneously to effect advancement of car wheels the transfer mechanism 52 is operating to advance car wheels one station, so that it would function to advance the car wheel in the station 33 into station 34. However, at the same time, the transfer mechanism 53 is engaging the same wheel in station 33 but is operating to advance car wheels two stations and would function to advance the car wheel in station 33 into station 35 but would be prevented from doing so by the control roller of the transfer mechanism 52 if such control roller were not omitted. Thus, by omitting the companion control roller for the advancing roller 158j and providing the stop mechanism 159, such interference is avoided and the transfer mechanism 53 is able to move the car wheel in station 33 two stations and beyond the range of the transfer mechanism 52.

With the arrangement shown, when the transfer mechanism 53 is operated so that the transfer bar 199 thereof is rotated to retract the arms 198 prior to a resetting movement of the transfer mechanism into the position it occupies, as shown in FIG. 2a, a limit switch (not shown) is actuated and operates to energize the solenoid 167 of the stop mechanism 159 to effect withdrawal of the plunger 169 thereof out of the path of the travel of the car wheels. Therefore, when the transfer mechanism 53 has been positioned, as shown in FIG. 2a, and the arms thereof are engaged with car wheels in the various stations, the transfer mechanism 53 may operate to advance the car wheels through two stations and will continue to move the car wheel out of engagement with the roller 158j of the arm 157e of the transfer mechanism 52, so as to advance it into the station 35. As the transfer mechanism 53 fully advances, another limit switch (not shown) will be released to effect de-energization of the solenoid 167 of the stop mechanism 159 to permit the plunger 169 thereof to be spring returned into the path of car wheel travel. In this condition the arrangement is set for the next cycle of operation wherein the transfer mechanisms 53 and 54 are idle and the transfer mechanism 52 operates to advance car wheels one station.

Each of the transfer mechanisms 50, 51, 52, 53, 54 and 55 are identical in construction and arrangement except for the length of the individual transfer bars, the description of the transfer mechanism 54 will apply to all of the other transfer mechanisms. It should be kept in mind, however, that the transfer mechanisms 50, 51, 52 and 55 operate every cycle while the transfer mechanisms 53 and 54 operating as a unit, operate only every other cycle. Therefore, the transfer mechanism 55 will operate to move workpieces in stations 45, 46 and 47 into stations 46, 47 and 48, respectively. Since at the time the transfer mechanism 55 operates in its first cycle the transfer mechanisms 53 and 54 are idled, station 45 will be vacant during one cycle. On the second cycle of operation the transfer mechanism 55 will operate to move car wheels that are in stations 46 and 47 into stations 47 and 48. The now vacated station 46 and the previously vacated station 45 are therefore free to receive car wheels from stations 43 and 44 by operation of the transfer mechanism 54.

As previously stated, the exemplary machine tool illustrated includes the storage station 20 and loading station 21 which cooperate to provide a novel means for providing a continuous supply of car wheels to the transfer line. As shown in FIG. 1, a plurality of car wheels are supplied to a storage rack 160 of the storage station 20 by suitable means such as a mobile truck or power lift (not shown). The rack 160 has a plurality of separate chuts or stalls 161, 162, 163, 164 and 165 formed by horizontally spaced apart fence rails. Thus, a plurality of car wheels are available in the individual chutes in an upright condition for movement individually into the loading station 21.

The unloading station 48 and storage or bank station 49 are very similar to the loading station 21 and storage station 20. The finished car wheels are transferred from the transfer line guide rail 65 by being rolled into an indexable carriage, generally identified by the reference numeral 275 in FIG. 1b. The carriage 275 is provided with a plurality of chutes 298 and the indexing movement of the carriage 275 serves to successively align each of these chutes 298 with the guide rail 65 for individually receiving the completed wheels in the manner described in the above mentioned Patent 3,118,332.

The move out stations 25, 29, 33 and 39 are identical in construction and operation and therefore the following description of the move out station 25 will apply to all of the move out stations. As shown in FIGS. 1, 10 and 11, the move out station 25 comprises a base or bed 385 that is arranged transversely of the transfer line. A carriage 386 having a plurality of flanged supporting wheels 387 is movably supported on a pair of longitudinally extending parallel rails 388 and 389 that extend the full length of the bed 385. A table 391 is supported on the carriage 386 for rotation about a shaft 392 that is secured in the carriage 386. The shaft 392 about which the table 391 rotates also serves to maintain and secure the table in position on the carriage 386. To this end, the table 391 is provided with a downwardly extending boss 394, having an axial opening 395 the upper portion 396 of which is enlarged so as to accommodate an enlarged head portion 397 of the shaft 392. An antifriction bearing 398 is mounted within the opening 395 of the table with the inner race thereof engaged upon the shaft 392. Thus, the table 391 is free to rotate on the shaft 392. An enlarged portion 399 of the shaft 392 engages against the top surface of the inner race of the bearing 398 while a spacer 401 mounted about the shaft 392 abuts the top surface of a carriage deck 402 and is disposed so that its opposite end engages against the opposite face of the inner race of the bearing 398. Thus, the bearing 398 is confined in position within the axial opening 395 of the table 391 between the spacer 401 and the enlarged portion 399 of the shaft 392. The lower end of the shaft 392 extends through an opening provided in the deck 402 of the carriage 386 and extends into a hub 403 provided on the under surface of the carriage deck 402 into engagement with an inwardly extending radial flange 404 that forms a shoulder for supporting and locking the shaft to the carriage. A reduced threaded portion 406 extends through an opening in the flange 404 and threadedly receives a nut 407 which is engaged thereon so as to snugly engage against the lower surface of the flange 404 of the hub 403 to thereby lock the shaft in vertical position to the carriage 386. The table 391 is provided with four supporting rollers 410, 411, 412 and 413 which are rotatably mounted in the table 391 and are spaced 90° apart, with the rollers being arranged so as to ride upon a circular way surface 414 provided on the top surface of the deck 402 of the carriage 386 to thereby stabilize and support the table 391 on the carriage 386 as it rotates about the shaft 392.

The table 391 is provided with a car wheel supporting and guiding rail 65a which in effect is a portion of the guide rail 65 previously mentioned but which is sectionalized at the move out stations so that it may move with the table 391.

Upstanding from the table 391 is a supporting structure, generally indicated at 416, comprising a pair of upright spaced columns 417, one of which is shown in FIG. 10. A horizontal bridge plate 418 is secured to the top of the columns, the entire structure being rigidly reinforced by means of an intermediate vertical column 419. Secured to and extending outwardly over the guide rail 65a are a pair of spaced arm members 421 and 422 to which is secured an outer upper fence rail 62b which is a sectionalized extension of the upper fence rail 62, previously described in connection with the transfer mechanism 54 and clearly shown in FIG. 5. An upper inner fence rail 61b likewise constitutes a portion of the upper inner fence rail 61 of the transfer line and is secured to the edge of the bridge plate 418 adjacent to the location of the car wheels. The sectionalized fence rails 61b and 62b serve to maintain the car wheel in a vertical position on the sectionalized guide and supporting rail 65a.

The carriage 386 is movable along the guide rails 388 and 389 and is actuated in its path of travel by means of a fluid actuator, generally indicated by the reference numeral 425, as shown in FIGS. 8 and 9. The fluid actuator 425 comprises a cylinder 426 this is disposed on the deck 420 of the bed 385 between the guide rails 388 and 389. The outer end of the cylinder 426 is pivotally secured as at 427 to a bracket 428 that is mounted on a vertical plate 429 which is fastened to the end of the bed 385. A piston (not shown) is reciprocally supported within the cylinder 426 and is provided with a piston rod 431, the free end 432 of which is secured to a depending bracket 433 that is carried by the frame of the carriage 386. When the piston 430 is in its leftward limit of movement, as viewed in FIG. 10, the free end 432 of the piston rod 431 extends approximately to the left end of the bed 385.

As previously mentioned, the table 391 is rotatably supported on the carriage 386 and is adapted to be rotated 90° as the carriage is moved rightwardly on the bed 385 in a retracting movement away from the transfer line. In this manner the car wheel, as it is withdrawn from the transfer line, will also be positioned so that it will be free to be rolled out of the retracted move out station mechanism off of the sectionalized guide rail 65a away from the machine tool. In order to effect the 90° rotation of the table 391 as the carriage is retracted, an angular extending cam plate 434 is secured to the top surface of the table. As shown in FIGS. 10, 11 and 12, the cam plate 434 is disposed on the table 391 to extend angularly therefrom at an angle of 45°. The cam plate 434 is provided with a cam track, generally identified by the reference numeral 436. The cam track 436 comprises a table rotating portion 437, the axis of which is disposed at 45° to the path of travel of the carriage 386 and also passes through the axis of the shaft 392 about which the table 391 is rotatable. The cam track 436 also includes and idle portion 438, the axis of which is disposed so as to be parallel to the path of travel of the carriage 391 and also to intersect the axis of the rotating portion 437 at an angle of 45°. A vertical cam follower 439 is disposed to extend within the cam track 436 and is fixedly mounted on a vertical bracket 441 that is secured to the side of the bed 385 as shown in FIG. 10.

As the fluid actuator 425 is energized to retract the carriage 386 to effect withdrawal of the car wheel from the transfer line, the carriage 386 and the table 391 will be moved rearwardly a distance sufficient to withdraw the car wheel from the transfer line. During this initial rearward movement, the cam follower 439 is located within the idle portion 438 of the cam track. Thus, when the car wheel is in the transfer line, the cam follower 439 will be in the position "A" within the idle portion 438 of the cam track, as shown in FIGS. 11 and 12. Upon initial retraction of the carriage rearwardly to clear the car wheel from the transfer line, the cam follower 439 will be in a position "B" within the cam track 436, as shown in FIG. 12a. As the carriage is further retracted the side 442 of the rotating portion 437 of the cam track 436 will engage the cam follower 439 to effect an arcuate shifting of the cam plate 434 and thereby force the table 391 to rotate on the carriage 386 in a clockwise direction, as viewed in FIG. 12a. As retraction of the carriage 386 continues, the carriage 386 will be moved in a position wherein the rotating portion 437 of the cam track 436 is transverse to the path of travel of the carriage thereby effecting rotation of the table 391 to a position which is 45° from its original aligned position, as shown in FIG. 12b. At this time the cam follower 439 will be in the position indicated at "C," in FIG. 12b. As carriage retraction continues, the side 422 of the table rotating portion 437 of the cam track 436 forcefully engages the cam follower 439 to effect further clockwise rotation of the table 391. When the carriage 386 is fully retracted, the table will have been rotated substantially 90° from its aligned position and the cam follower 439 will be at the position "D," as indicated in FIG. 12c.

Energization of the fluid actuator 425 is effected by manually actuating a lever 446 rightwardly, as viewed in FIG. 10, the lever 446 operating to position a plunger within a valve body 447 to direct fluid pressure through a normally open deceleration valve 448 from whence it is directed to the fluid actuator 425 to activate it in a direction to retract the carriage 386. As the carriage approaches a fully retracted position, a dog 449 mounted on the side of the carriage 386 engages a plunger 450 of the deceleration valve 448 for moving it inwardly to gradually restrict the flow of fluid pressure through the valve and slow the action of the fluid actuator 425. The deceleration valve 448 is not, however, completely closed, and the fluid actuator 425 will operate to retract the carriage 386 at a slow rate until the carriage engages a positive stop 451, shown in FIG. 11, positioned at the end of the bed 385.

To return the carriage to its advanced location in the transfer line, the lever 446 is manually actuated to its vertical position, as viewed in FIG. 10, which operates to position the plunger of the valve 447 so as to direct fluid pressure to the head side of the piston 430 in the cylinder 426. Since the deceleration valve 448 is maintained partially closed by reason of the dog 449 being in engagement with the plunger 450 of the valve 448, the advancing movement of the carriage will be at a slow rate until the dog 449 is moved out of engagement with the plunger 450 permitting the valve 448 to be conditioned to its normal open condition. As the carriage 386 returns the table 391 will be rotated in a counterclockwise direction 90° to its original position by operation of the cam follower 439 and cam track 436. The full adavance position of the carriage 386 is established by means of an adjustable positive stop 452 mounted on the front end of the bed 385, shown in FIGS. 10 and 11.

The fixture heads 81, 81a, 95 and 95a of the work stations 27, 31, 36 and 43, respectively, all operate in a manner to engage a car wheel in the transfer line at their respective stations, and are operable to withdraw the car wheel from the transfer line into clamped engagement with the fixture head so that it may be rotated in a work operation. The fixture heads each have braking means whereby rotation of the fixture heads is stopped prior to the return of the car wheel into the transfer line.

The inspection station 46, as shown in FIG. 9, comprises a base or bed 835 that is disposed transversely of the transfer line, and on which is movably supported a car wheel supporting frame, generally identified by the reference numeral 836. The movable car wheel supporting frame 836 comprises a pair of parallel side members 837, one of which is shown, that are upstanding from a base plate 838. The side members 837 are rigidly connected together by means of a reinforcing tie member 839. Upstanding from the top surface of the bed 835 and disposed on either side of the side members 837 are a pair of trunnions 841, one of which is shown. The trunnions support inwardly extending stub shafts 842 on which the car wheel supporting frame 836 is pivotally mounted for movement from the upright position, as shown in full lines in FIG. 9, to a horizontal position, shown in broken lines therein. For supporting a car wheel in position at the station 46 the guide rail 65 is interrupted and the station provided with a pair of aligned supporting rollers 846 and 847. The rollers 846 and 847 are identical and therefore reference will be made to the roller 847 with the description thereof applying to its companion roller 846.

The roller 847 having a tapered periphery which is inclined inwardly toward its axis, its configuration being a frustum of a cone, as shown in FIG. 9, is rotatably supported on a stub shaft 848 which is mounted in a bracket 849 that extends upwardly from the base plate 838 of the car wheel supporting frame 836. The pair of aligned supporting rollers 846 and 847 serve to receive and support the car wheels which are transferred along the guide rail 65 and into position in the station 46. Likewise, the upper fence rail 61 and the lower fence rail 63 are interrupted at station 46 and replaced by a pair of bar members 850 and 851 which are secured to the front surfaces of the side members of the supporting frame 836. Since the peripheries of the rollers 846 and 847 are tapered inwardly toward the frame 836, as shown in FIG. 9, a car wheel moved onto the rollers will be urged against the bar members 850 and 851 so as to be maintained in an upright position. To remove the car wheel from the line for inspection purposes the frame 836 is moved from the vertical position, as shown in full lines in FIG. 9, to a horizontal position, as shown in broken lines in FIG. 9, and while this is being done the car wheel must be securely clamped to the supporting frame 836. To clamp the car wheel to the frame member 836 a clamp member 855 is provided which operates to clamp the car wheel on the supporting rollers 846 and 847, and also to draw the car wheel against the bar members 850 and 851. To this end, the clamp 855 comprises an arm 856 which is pivotally secured to a bracket 857 that depends from the tie member 839. The arm member 856 is disposed so as to engage the periphery of the car wheel by being moved into position through a fluid actuator 858 which is operable to pivot the arm 856 into a clamping engagement with the car wheel or to effect movement of the arm 856 out of clamping engagement therewith.

The fluid actuator compises a cylinder 859, one end of which is pivotally connected to a horizontally extending bracket 861 that is secured to a cross plate 862 carried by the side members 837 of the supporting frame 836. The cylinder 859 reciprocally supports a piston having a piston rod 863, the free end of which is pivotally connected to the end of the arm 856 as at 864. As the fluid actuator 855 is energized to effect outward movement of the piston rod 863, the arm 856 is pivoted about the bracket 857 so as to move the end of the arm adjacent the car wheel downwardly to engage a pad 865 thereof into the radius formed by the flange and tread of the car wheel, to clamp the car wheel to the supporting rollers 846 and 847 on which it is cradled and against the bar member 850 and 851. In a releasing action the actuator 858 is energized for operation in the opposite direction, moving the piston rod 863 inwardly within the cylinder 859 thereby disengaging the arm 856 from the car wheel to free the car wheel for further advancement to station 47 through the operation of the transfer mechanism 55. When the car wheel is clamped, the supporting frame 836 may be pivoted between its vertical position and its horizontal position by operation of a fluid actuator 867 which is operable to pivot the frame 836 about the stub shafts 842 of the trunnions 841. The fluid actuator 867 comprises a cylinder 868 which is horizontally disposed in the bed 835 and has one end thereof pivotally secured thereto. The cylinder 868 supports a movable piston that is provided with a piston rod 869 which extends outwardly of the cylinder 868 having its outer end pivotally connected to a bracket 871 that is welded or otherwise secured to the bottom surface of the bottom plate 838 of the supporting frame 836. The fluid actuator 867 may be energized to lower the supporting frame 836 into a horizontal inspection position by manually moving a lever 872 rightwardly as viewed in FIG. 9 from a vertical neutral position. Rightward movement of the lever 872 operates to condition a valve 873 that it is associated with to direct fluid pressure to the hydraulic actuator 867 to effect its operation for lowering the supporting frame 836. By manually returning the actuating lever 872 to the vertical position the fluid actuator 867 will be energized to effect movement of the supporting frame 836 upwardly into the vertical position to return the car wheel into the transfer line. Likewise, the clamp actuator 858 is energized by manually manipulating a lever 875 rightwardly from its vertical position shown, which movement conditions a valve 876 that it is associated with to effect energization of the fluid actuator 858 for a clamping operation. To reverse the operation of the actuator 858 for releasing the car wheel, the lever 875 is returned to its vertical position. The valves 873 and 876 are mounted on a supporting bracket 878 that is secured to the side of the bed 835.

With the arrangement described, a car wheel at the inspection station and in an upright condition will be cradled on the supporting rollers 846 and 847 and maintained in an upright condition by the bars 850 and 851, and the upper fence rail 62. In this position the car wheel may be manually rotated on the rollers 846 and 847 for inspection purposes so that all portions of the rear face of the car wheel can be readily observed by the inspector. For gauging the flange and periphery of the car wheel and for inspecting the front face thereof the car wheel may be clamped and the frame 836 lowered to the horizontal position and inspection may be conveniently performed.

From the foregoing detailed description of the structure and operation of the illustrated embodiment of the present invention, it will be apparent that an improved transfer type machine tool has been provided which is especially adapted to facilitate the inspection of the completed workpieces before they are removed from the machine by including an inspection station wherein a heavy workpiece can be maneuvered into any desired position for the convenience of the operator and with a minimum amount of effort on the part of the operator.

Although the illustrative embodiments of the invention have been described in considerable detail for the purpose of making a full disclosure of a practical operative structure, it is to be understood that the various novel features of the invention may be incorporated in other structural forms without departing from the spirit and scope of the invention, as defined in the subjoined claims.

The principles of this invention having now been fully explained in connection with the foregoing description, we hereby claim as our invention:

1. In a transfer and handling apparatus for circular edge supported workpieces requiring continuous support to prevent lateral tipping in either direction:
    a longitudinally extending guideway comprising a plurality of longitudinally spaced apart upper and lower guide rails constituting a transfer pathway for supporting and guiding a circular workpiece on edge in an upright position for movement therealong;
    a station along said transfer pathway at which a workpiece may be removed or inserted out of or into said transfer pathway selectively, said station comprising a laterally movable frame member;
    a pair of longitudinally spaced apart rotatable support rollers carried by said frame and disposed in alignment with said lower guide rail to cooperate with said lower guide rail to provide a continuous pathway, said support rollers being further operable to support a circular workpiece on edge in an upright position in a manner that the workpiece may be rotated about its own axis;
    lateral guide means carried by said frame and operable to prevent lateral tipping movement in either direction of a circular workpiece supported on edge on said supporting rollers;

a clamping member carried by said frame for engagement with a workpiece supported on said rollers, said clamping member in cooperation with said support rollers being operable to securely clamp a workpiece therebetween;

power means connected to actuate said clamping member in a clamping or releasing action selectively;

a power driven transfer mechanism operable to engage and advance edge supported circular workpieces along said transfer pathway into position on said supporting rollers; and, second power means connected to move said frame member with a workpiece secured thereto laterally out of said transfer pathway.

2. In a circular workpiece handling apparatus:

a transfer guideway operable to support and guide a circular workpiece on edge in an upright position for movement therealong;

an inspection station along said transfer guideway comprising a pair of roller supports aligned with the path of the transfer guideway and an upwardly spaced selectively engageable clamp member, said clamp member and said roller supports disposed to cooperate to secure a workpiece therebetween, said clamp member and said roller supports being carried for bodily lateral movement for moving a workpiece out or into said transfer guideway;

power means connected to actuate said clamp member into or out of workpiece engagement selectively;

second power means operably connected to bodily move said clamp member and said roller supports laterally; and, a power driven transfer means connected to effect the movement of edge supported circular workpieces along said transfer guideway for selectively positioning workpieces at said inspection station, whereby a circular workpiece is supported on its edge in an upright position for movement into and out of said inspection station, and the workpiece may be rotated in said inspection station for inspection purposes, and a workpiece may be removed from said transfer guideway or inserted therein selectively.

3. In an article handling apparatus for edge supported circular workpieces:

a movable frame;

a pair of rotatable supports carried by said frame and constituting lower guide means;

upper guide means cooperating with said lower guide means to support a circular workpiece on edge in an upright position for rotation on said rotatable supports;

a movable clamp member supported by said frame in vertically spaced relationship to said rotatable supports;

power means connected to operate said clamp member into engagement with a circular workpiece supported on edge on said pair of rotatable supports to securely clamp a workpiece therebetween;

second power means connected to move said frame for moving a clamped workpiece laterally;

upper and lower transfer guide means respectively disposed at opposite sides of said rotatable supports and said upper guide means for cooperation therewith to constitute a continuous transfer pathway; and, power operated transfer means engageable with the edge of said circular workpiece on opposite sides thereof to guidably constrain the edge supported circular workpiece for movement along said transfer pathway.

4. In a workpiece handling apparatus for supporting and handling circular workpieces that require lateral support for maintaining them upright:

a transfer pathway comprising support means and longitudinally extending transversely spaced guide means cooperably disposed to support and guide a circular workpiece on edge in upright position;

an inspection station disposed along said transfer pathway comprising a movable frame provided with spaced rollers rectilinearly aligned with said support means, said rollers being adapted to support a circular workpiece for both rectilinear transfer movement and for rotatable inspection movement;

power means connected to effect selective movement of said frame from its normal position wherein said rollers are rectilinearly aligned with said support means; and, a power driven transfer means operative to advance a workpiece on edge along said transfer pathway and into said inspection station in position on said rollers for rotation.

5. In a workpiece handling apparatus:

a continuous transfer pathway along which circular workpieces are moved on edge and in upright position;

an inspection station disposed along said transfer pathway into which a workpiece is moved, said inspection station having means for rotatably supporting the circular workpiece therein, said inspection station also being adapted to move a circular workpiece in said station out of an upright position into a horizontal position; and, power operated transfer means operably connected to move workpieces along said transfer pathway and individually locate them in said inspection station and remove them therefrom.

6. In a transfer and handling apparatus for edge supported workpieces:

support means for supporting workpieces on edge in an upright position for movement in a predetermined path of travel;

an inspection station disposed to receive a workpiece in upright position from said support means, said inspection stations comprising laterally movable means for rotatably supporting a workpiece for rotation about its own axis and a cooperative laterally movable clamp member selectively engageable with a workpiece supported in upright position on said rotatable supporting means to securely clamp a workpiece therebetween;

means operably connected to actuate said clamp member towards said rotatably supporting means;

means operably connected to effect the simultaneous lateral movement of said rotatable supporting means and said clamp member to thereby move a workpiece secured therebetween laterally out of the predetermined path of travel; and, power operated transfer means to move workpieces along said support means in the predetermined path of travel and individually locate them in said inspection station and remove them therefrom.

7. In a transfer and handling apparatus for edge supported workpieces:

support means for supporting the workpieces on edge in an upright position for movement in a predetermined path of travel;

an inspection station disposed to receive workpieces moved along said support means, said inspection station comprising roller supporting means operably arranged to receive workpieces moved along said support means and to rotatably support a workpiece in an upright position for rotation about its own axis; and, transfer means for moving workpieces successively along said support means into said inspection station.

8. In a transfer and handling apparatus for edge supported workpieces:
   support means for supporting workpieces on edge in an upright position for movement in a predetermined path of travel;
   means for receiving a workpiece from said support means and operable to support the workpiece in upright position for rotation about its own axis; and,
   power operated workpiece advancing means operable to move a workpiece along said support means and locate it in said receiving means and remove it therefrom.

9. In an article handling apparatus for moving an edge supported circular workpiece into and out of a transfer line along which the workpiece is adapted to be advanced:
   a frame disposed adjacent the transfer line and adapted to be pivotally movable about a horizontal axis which is parallel to the transfer line;
   a pair of rotatable supports rotatably supported by said frame and disposed to extend into the path of travel of a circular workpiece being transferred along the transfer line, said pair of rotatable supports constituting lower guide means adapted to receive the edge of an edge supported circular workpiece in the plane in which the workpiece is transferred along the transfer line;
   a movable clamp carried by said frame in vertical spaced relationship to said pair of rotatable supports, said clamp in cooperation with said rotatable supports being operable to securely clamp an edge supported circular workpiece therebetween;
   power means carried by said frame and connected to actuate said clamp;
   a second power means operably connected to effect pivotal movement of said frame for moving a workpiece out of said transfer line;
   a pair of longitudinally spaced apart laterally movable transfer elements selectively engageable with the side edges of a circular workpiece supported on the transfer line for rectilinear movement; and,
   a third power means connected to effect lateral movement of said transfer elements into and out of engagement with a workpiece.

10. In apparatus for facilitating the inspection of a circular workpiece supplied to it in an upright position;
    a base;
    a frame pivotally supported on said base for movement between an upright position and a horizontal position;
    a pair of rollers rotatably supported by said frame in alignment to receive and rotatably support a circular workpiece in an upright position thereon;
    a clamp member carried by said frame in position to clamp a workpiece in position on said rollers;
    a first power means mounted on said frame and operably connected to actuate said clamp member in a clamping or releasing action;
    a second power means mounted on said base and operably connected to pivot said frame and thereby the workpiece clamped thereto from a vertical position to a horizontal position;
    a first control means operably connected to effect operation of said first power means; and,
    a second control means operably connected to actuate said second power means;
    whereby a workpiece positioned on said rollers may be rotated thereon in an upright position and the workpiece may be clamped to said rollers and said frame and pivoted from a vertical position to a horizontal position so as to facilitate inspection of the upwardly facing surface of the workpiece.

11. In apparatus for handling a circular workpiece:
    a base;
    a frame pivotally mounted on said base for movement between a vertical position and a horizontal position;
    rotatable supports carried by said frame for receiving and rotatably supporting a circular workpiece in an upright position;
    a clamp mechanism carried by said frame in position to be engageable with a workpiece on said rotatable supports and operable when engaged with the workpiece to effectively clamp it in position on said rotatable supports;
    a first reversible power source carried by said frame and operably connected to actuate said clamp mechanism in a clamping or releasing action; and,
    a second reversible power source mounted on said base and operably connected to actuate said frame between a vertical position and a horizontal position;
    whereby a workpiece on said rotatable supports may be rotated in an upright position and the workpiece may be clamped in upright position on said rotatable supports and said frame actuated to pivot the workpiece from an upright position to a horizontal position.

12. In an article handling device for handling workpieces on edge in an upright position and which provides support for maintaining the workpieces in an upright position:
    a longitudinally extending guide rail disposed to support a workpiece therealong, said guide rail comprising stationary rail portions and bodily movable rail portions normally maintained in longitudinal alignment with said stationary rail portions to constitute a continuous supporting guideway;
    longitudinally extending stationary upper fence rails disposed to cooperate with said stationary workpiece supporting guideways to maintain an edge supported workpiece upright on said guideway;
    movable upper fence rail portion aligned with said stationary upper fence rails to constitute a continuous upper constraining means which operates to prevent lateral tipping of the edge supported workpiece in either direction;
    a transfer means operably connected to move a workpiece along said stationary guide rail for positioning the workpiece upon the movable portion of said guide rail; and,
    power means connected to effect bodily movement of said movable guide rail and said movable fence rail portions out of alignment with the respective stationary guide rails and fence rails,
    whereby an edge supported workpiece may be moved out of or inserted into the longitudinally extending guideway selectively.

13. In apparatus for removing a circular workpiece in an upright position from a transfer line:
    a base located in the transfer line;
    a carriage supported on said base in position to intersect the transfer line, said carriage being movably supported on said base for movement between an aligned position and a retracted position;
    a table rotatably supported on said carriage for movement with it and for independent rotation relative to it;
    a guideway mounted on said table in position to receive a workpiece from the transfer line and operable to support the workpiece in an upright position;
    power means carried by said base and operably connected to said carriage to actuate it in its path of travel between an aligned position and a retracted position; and,
    table rotating mechanism operably connected to effect rotation of said table on said carriage as said carriage is moved in its path of travel.

14. In apparatus for moving a circular workpiece in an upright position from one position to another:
    a base;
    a carriage movably supported on said base for movement between a first position and a second position;
    a table pivotably supported on said carriage for movement with it and for pivotal movement relative to it;
means on said table operable to receive and support a circular workpiece in an upright position on said table so that the workpiece will move with said table;
a source of power carried by said base and operably connected to actuate said carriage in its path of movement; and,
means operably connected to effect the pivotal movement of said table on said carriage as said carriage is moved on said base.

15. In apparatus for moving a circular workpiece in an upright position from one position to another:
a base;
a carriage supported on said base for movement between a first position to a second position;
a table supported on said carriage for rotational movement relative to it;
a guideway on said table operable to receive and support a circular workpiece in an upright position for movement with said table;
a power source mounted on said base and operably connected to actuate said carriage in its path of movement; and,
a cam and cam follower mechanism operably connected to effect rotational movement of said table relative to said carriage as said carriage is moved in its path of travel,
whereby a circular workpiece supported on said table in an upright position may be moved from a first position to a second position and angularly orientated in a different direction when in said second position in respect to its initial direction in the first position.

References Cited by the Examiner
UNITED STATES PATENTS
1,479,767   1/1924   Wolf.
2,883,858   4/1959   Bishman.

FOREIGN PATENTS
1,028,871   5/1953   France.

SAMUEL F. COLEMAN, *Primary Examiner.*
EDWARD A. SROKA, *Examiner.*